United States Patent
Swartling et al.

(10) Patent No.: US 8,612,105 B2
(45) Date of Patent: Dec. 17, 2013

(54) SYSTEM FOR CONTROL OF A GEARBOX

(75) Inventors: Fredrik Swartling, Södertälje (SE); Peter Asplund, Mariefred (SE); Mikael Öun, Norsborg (SE)

(73) Assignee: Scania CV AB (SE)

(*) Notice: Subject to any disclaimer, the term of this patent is extended or adjusted under 35 U.S.C. 154(b) by 0 days.

(21) Appl. No.: 13/392,912

(22) PCT Filed: Sep. 10, 2010

(86) PCT No.: PCT/SE2010/050964
§ 371 (c)(1),
(2), (4) Date: Feb. 28, 2012

(87) PCT Pub. No.: WO2011/031222
PCT Pub. Date: Mar. 17, 2011

(65) Prior Publication Data
US 2012/0158263 A1    Jun. 21, 2012

(30) Foreign Application Priority Data
Sep. 14, 2009   (SE) ........................... 0950667

(51) Int. Cl.
F16H 59/46 (2006.01)
F16H 59/48 (2006.01)

(52) U.S. Cl.
USPC ................. 701/55; 477/80; 477/120

(58) Field of Classification Search
None
See application file for complete search history.

(56) References Cited

U.S. PATENT DOCUMENTS

| | | | |
|---|---|---|---|
| 4,947,331 A | 8/1990 | Speranza | 364/424.1 |
| 5,730,682 A * | 3/1998 | Depping et al. | 477/120 |
| 6,067,495 A | 5/2000 | Fliearman et al. | 701/55 |
| 6,113,516 A * | 9/2000 | Janecke | 477/124 |
| 6,461,273 B1 * | 10/2002 | Davis et al. | 477/98 |
| 6,692,406 B2 * | 2/2004 | Beaty | 477/32 |
| 6,871,131 B2 * | 3/2005 | Brandt et al. | 701/51 |
| 7,993,241 B2 * | 8/2011 | Schaarschmidt et al. | 477/80 |
| 2003/0060328 A1 * | 3/2003 | Beaty | 477/109 |

(Continued)

FOREIGN PATENT DOCUMENTS

DE   10 2004 002 813    8/2005
EP   1 070 879          1/2001

OTHER PUBLICATIONS

International Search Report mailed Dec. 14, 2010 in corresponding PCT International Application No. PCT/SE2010/050964.

*Primary Examiner* — Mary Cheung
*Assistant Examiner* — Demetra Smith-Stewart
(74) *Attorney, Agent, or Firm* — Ostrolenk Faber LLP

(57) ABSTRACT

A system for control of a gearbox, having at least one control unit controlling the gearbox where the gearbox is installed in a motor vehicle having an engine connected to drive the gearbox. The system effects a first upshift from a first gear to a second gear if the acceleration a for the vehicle is greater than nil for the second gear and the current engine speed is within a first engine speed range; and effects a second upshift from the first gear to a third gear if the current engine speed is within a second engine speed range. The first speed range is lower than the second speed range of the engine. A method, a motor vehicle, a computer program and a computer program product for the method are disclosed.

15 Claims, 3 Drawing Sheets

(56) References Cited

U.S. PATENT DOCUMENTS

2006/0234827 A1* 10/2006 Sakamoto et al. .............. 477/30
2007/0105690 A1* 5/2007 Steinhauser et al. .......... 477/115
2009/0271081 A1* 10/2009 Watanabe et al. ............... 701/60
2010/0184561 A1* 7/2010 Schaarschmidt et al. ....... 477/78

* cited by examiner

SYSTEM FOR CONTROL OF A GEARBOX

CROSS-REFERENCE TO RELATED APPLICATIONS

The present application is a 35 U.S.C. §§371 national phase conversion of PCT/SE2010/050964, filed Sep. 10, 2010, which claims priority of Swedish Application No. 0950667-6, filed Sep. 14, 2009, the contents of which are incorporated by reference herein. The PCT International Application was published in the English language.

TECHNICAL FIELD

The present invention relates to a system for control of a gearbox installed in a motor vehicle. The invention further relates to a method, a motor vehicle, a computer program and a computer program product thereof for the system.

BACKGROUND TO THE INVENTION

FIG. 1 depicts schematically parts of a power train for a motor vehicle 1, such as a passenger car or a heavy vehicle, e.g. a truck or bus. The power train comprises an engine 10 mechanically connected by a shaft to a first end of a gearbox 20 via a clutch device 40. The gearbox 20 is also mechanically connected, at its other end, by a propeller shaft 50 to a differential gear 30 associated with a rear axle. The rear axle comprises respective left and right drive shafts 60 which drive the vehicle's powered wheels (not depicted in the diagram).

With this well-known arrangement, the mechanical work of the engine 10 is transmitted via various transmission devices (e.g. clutch device 40, gearbox 20, propeller shaft 50, differential gear 30 and drive shafts 60) to powered wheels in order to move the vehicle 1. An important device in the power train is the gearbox 20, which has a number of forward gears for moving the vehicle 1 forwards, and usually also one or more reverse gears. The number of forward gears varies but modern kinds of trucks are, for example, usually provided with twelve forward gears.

The gearbox 20 may be of manual or automatic type (automatic gearbox), but also of the automatic manual gearbox type (automatic manual transmission, AMT). Automatic gearboxes and automatic manual gearboxes are automated gearbox systems usually controlled by a control unit 110 (sometimes also called electronic control unit, ECU) which is adapted to controlling the gearbox 20, e.g. during gear changing, as when choosing gears at a certain vehicle speed with a certain running resistance. The ECU may measure engine speed and the state of the gearbox 20 and control the gearbox 20 by means of solenoid valves connected to compressed air devices. Information about the engine 10, e.g. its speed and torque, is also sent from the engine 10 to the ECU, e.g. via a CAN (controller area network) bus.

In conventional gear change systems, the control unit 110 uses tabulated engine speed limits, also called shift points, which represent the engine speed at which a downshift or upshift should be effected in the gearbox 20, i.e. the vehicle 1 changes gear when the speed of its engine 10 passes a speed represented by a shift point. The shift points may therefore be construed as providing information not only about when a downshift or upshift should take place but also about the number of gear steps to be effected at each downshift or upshift. It is usual for each shift point to comprise one to three gear steps, although more steps are possible.

FIG. 2 depicts schematically an example of various tabulated shift points represented by lines SP1-SP6 in a graph where the x axis represents engine torque and the y axis the speed of the engine 10 in revolutions per minute (rpm). So long as the engine speed is between shift lines SP1 and SP4 no gear change takes place, but if it rises above an upshift line, SP1-SP3, an upshift is initiated, and conversely a downshift is initiated if the engine speed drops below a downshift line, SP4-SP6. Table 1 below shows a number of upward or downward gear steps for each of the lines SP1-SP6. For example, an upshift by one step takes place if the engine speed rises above line SP1 and a downshift by two steps if the engine speed drops below line SP5.

TABLE 1

| Downshift and upshift lines SP1-SP6 | |
| --- | --- |
| SP1 | Engine speed for upshift by 1 step |
| SP2 | Engine speed for upshift by 2 steps |
| SP3 | Engine speed for upshift by 3 steps |
| SP4 | Engine speed for downshift by 1 step |
| SP5 | Engine speed for downshift by 2 steps |
| SP6 | Engine speed for downshift by 3 steps |

Shift point choices affect inter alia running characteristics, acceleration, comfort and fuel consumption for the vehicle 1, so shift points have to be accurately calibrated by vehicle manufacturers. This calibration involves various gearshift strategies being tested in the field in different driving situations, e.g. with different amounts of acceleration applied, different road gradients and different vehicle-combination weights. The test results have then to be thoroughly analysed to determine appropriate shift points. This procedure for calibration of shift points is both time-consuming and expensive.

Moreover, the results of the calibration are not always satisfactory in that the calibrated shift points may be appropriate for certain driving situations but less so for others.

The specification of EP1070879 refers to a method and a system for control of an automated mechanical transmission system during upshifts. According to that specification, the way upshifts are effected takes an accelerator pedal position into account.

BRIEF DESCRIPTION OF THE INVENTION

An object of the present invention is to propose an alternative system for control of a gearbox. Another object of the invention is to propose a system for control of a gearbox, which totally or partly solves the problems of the state of the art. A further object of the invention is to propose a system for control of a gearbox, which fully utilises the engine's power output.

According to an aspect of the invention, the above objects are achieved with a system for control of a gearbox, which system comprises at least one control unit to control the gearbox, where the gearbox is installed in a motor vehicle which comprises an engine connected to drive the gearbox. The system:
  effects a first upshift from a first gear to a second gear if the acceleration a for said vehicle is greater than nil for said second gear and the current engine speed is within a first engine speed range, and
  effects a second upshift from said first gear to a third gear if the current engine speed is within a second engine speed range, said first speed range being a lower speed range than said second speed range of said engine.

The invention relates also to a motor vehicle comprising at least one system as above.

According to another aspect of the invention, the above-mentioned objects are achieved with a method for changing gear in a gearbox installed in a motor vehicle which comprises an engine connected to drive the gearbox, which method comprises the steps of:

effecting a first upshift from a first gear to a second gear if the acceleration a for said vehicle is greater than nil for said second gear and the current engine speed is within a first engine speed range, and effecting a second upshift from said first gear to a third gear if the current engine speed is within a second engine speed range, said first speed range being a lower speed range than said second speed range of said engine.

The invention relates also to a computer program comprising program code, which program, when the program code is executed in a computer, causes the computer to effect the above method. The invention relates also to a computer program product belonging to the computer programme.

The method according to the invention may also be modified according to the various embodiments of the above system.

A system and a method according to the invention provide improved drivability sensation in that upshifts are imposed when the engine so allows. The engine's full power output is also utilised in a better way than in the state of the art, making it possible, for example, to achieve higher vehicle speeds.

Further advantages and applications of a system and a method according to the invention are indicated by the detailed description set out below.

BRIEF DESCRIPTION OF THE DRAWINGS

In the detailed description of the present invention set out below, embodiments of the invention are described with reference to the attached drawings, in which:

FIG. 4 depicts a control unit forming part of a system according to the invention; and.

DETAILED DESCRIPTION OF THE INVENTION

Figure 1:
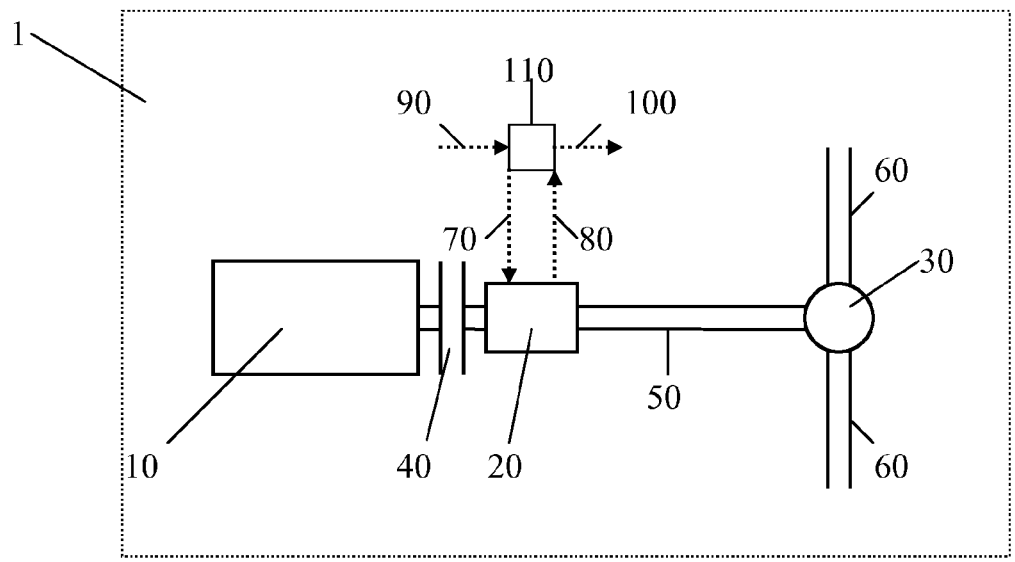
FIG. 1 depicts schematically part of a power train for a motor vehicle.
Figure 2:
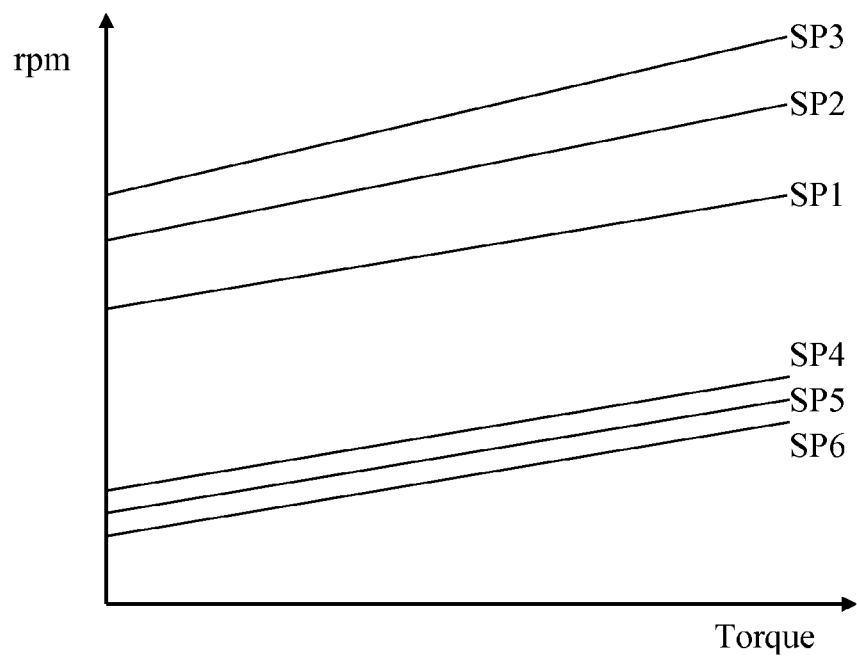
FIG. 2 is a graph of downshift and upshift lines.

As described above, conventional systems use tabulated shift points. Despite these shift points being carefully calibrated by vehicle manufacturers, driving situations may occur in which these calibrated shift points are not satisfactory from a drivability perspective. Nor is the full power output of the engine 10 utilised with such calibrated shift points.

For example, a situation which may arise when a motor vehicle 1 is travelling uphill is that a shift point for effecting an upshift, e.g. one step up, is at such a high engine speed that the vehicle 1 is unable to accelerate to that engine speed. This situation means that an upshift does not take place despite the fact that the vehicle 1 can accelerate in the next higher gear and should therefore be able to reach a higher running speed in that higher gear. To prevent such a situation occurring, calibration usually involves keeping upshift points at low engine speeds to make upshift possible. However, the result of such calibration is that the vehicle 1 seems to be "tired" in that the upshift takes place at a lower engine speed than is usually desired.

The present invention therefore relates to a system for control of a gearbox 20. The gearbox 2Q is preferably of the kind which forms part of an automated gear change system controlled by a control unit 110, e.g. an ECU. In such a gear change system, gear changes are effected automatically by the control unit 110, but it is also usual for the driver to be able to execute manual gear changes in an automatic gear change system, which is known as manual gear change in automatic state (automatic mode). The gearbox 20 also has a plurality of gears, e.g. twelve forward gears and one or more reverse gears are usual in modern trucks.

The system comprises at least one control unit 110 adapted to controlling said gearbox 20. The system is also adapted to imposing one or more upshift steps, depending on which engine speed range the engine 10 is in and on whether certain other conditions are fulfilled. If the engine 10 is in a first speed range I1 in a first gear G1 and the acceleration a of the vehicle 1 is greater than nil for a second gear G2, an upshift from the first gear G1 to the second gear G2 is effected (is imposed); and if the engine is in a second speed range I2 and this second speed range I2 is a higher speed range than the first speed range I1, an upshift from the first gear G1 to a third gear G3 is effected (is imposed).

The advantage of such a system for control of a gearbox 20 is that the vehicle 1 will not always effect an upshift when it is possible for it to do so, i.e. when more power is achievable in a higher gear. A higher vehicle speed may therefore be reached and fuel be saved by running in the next gear at a lower engine speed. Moreover, an upshift can take place without the vehicle 1 seeming tired, since the upshift cannot be imposed at the same time as the vehicle 1 is accelerating if the engine 10 will not deliver more power in the next gear.

Deciding whether the condition of the acceleration a of the vehicle 1 being greater than nil for the second gear G2 is fulfilled involves calculating what engine speed on the torque curve will in the second gear G2 provide sufficient power to overcome the running resistance, i.e. the force which acts against the vehicle 1 in the direction of movement. According to an embodiment of the invention, the gear change system may use a threshold value which the acceleration a for the second gear G2 is compared with. If the acceleration a is found to be greater than this threshold value, the above condition is deemed fulfilled and an upshift from the first gear G1 to the second gear G2 is imposed. The threshold value may for example be greater than or equal to 5 rpm/s. It will be appreciated by specialists that this value is adjustable, e.g. by calibration, so that upshifts take place as desired with respect to other system parameters.

Figure 3:
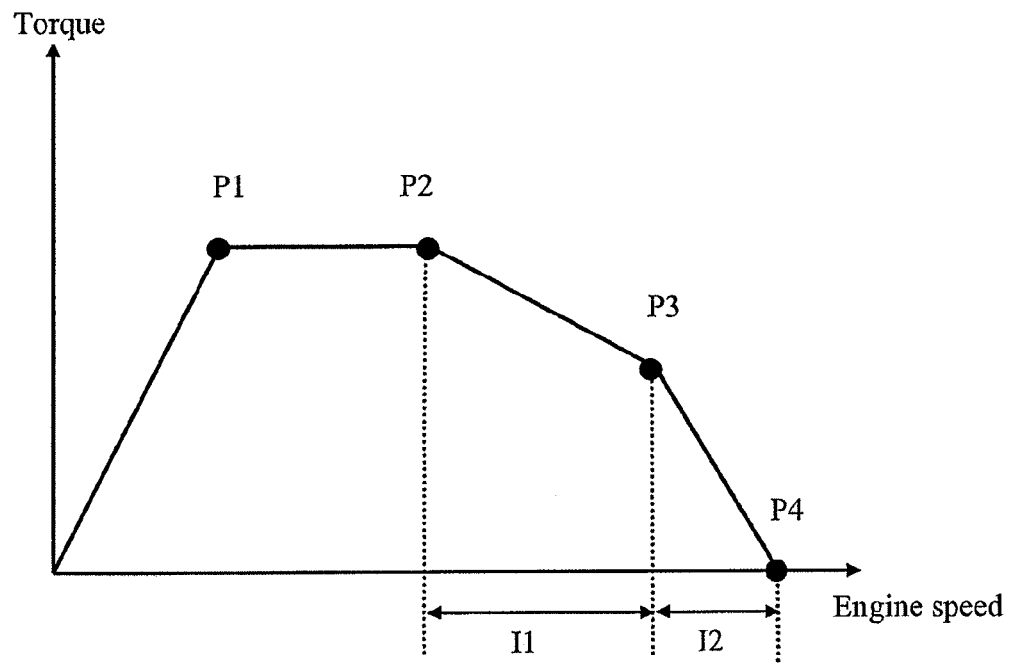
FIG. 3 is a graph of engine torque as a function of engine speed.

FIG. 3 is a graph of engine torque as a function of engine speed. P1 is the point on the torque curve corresponding to the lowest engine speed for which acceleration a of the vehicle 1 is possible, and P2 corresponds to the lowest possible engine speed for an upshift which leads to the engine speed after changing gear becoming equal to or greater than the engine speed at P1. Point P3 corresponds to the engine speed at which the power output from the engine 10 is the same before and after an upshift. Point P4 represents the maximum speed of the engine 10. According to the invention, speeds P2 and P3 define the first engine speed range I1, and speeds P3 and P4 correspondingly define the second engine speed range I2.

As depicted in FIG. 3, the first and second speed ranges I1 and I2 are mutually adjacent and are demarcated by point (engine speed) P3. The first speed range I1 comprises the engine speeds at which acceleration is possible in the second gear G2, and the second speed range I2 comprises the engine speeds at which the power output from the engine 10 is greater in the third gear G3 than in the first gear G1.

According to an embodiment of the invention, the second gear G2 and the third gear G3 are the same gear, and the upshift is preferably by a single gear step, although two or more steps are possible, as specialists will appreciate.

According to another embodiment of the invention, the second gear G2 and the third gear G3 are different gears, which means that the number of gear steps for the first and second upshifts will differ, e.g. the first upshift may involve a single step and the second upshift two steps, although the opposite is also possible.

The first and second upshifts may be effected by upshift points being moved downwards to correspond to a lower engine speed after such movement. The advantage of this is that no shift points will be so high that the maximum power output of the engine 10 is not used. The engine 10 is thus utilised more effectively.

In practice, imposition of upshift may be achieved by only the shift point for a single-step upshift (i.e. upshift by a single gear step) being lowered to below the current speed of the engine 10. The shift points for multi-step upshifts are not affected. In other words, this method of imposing upshifts will not affect the gear change system in situations where a two-step gear change is effected.

Figure 5:
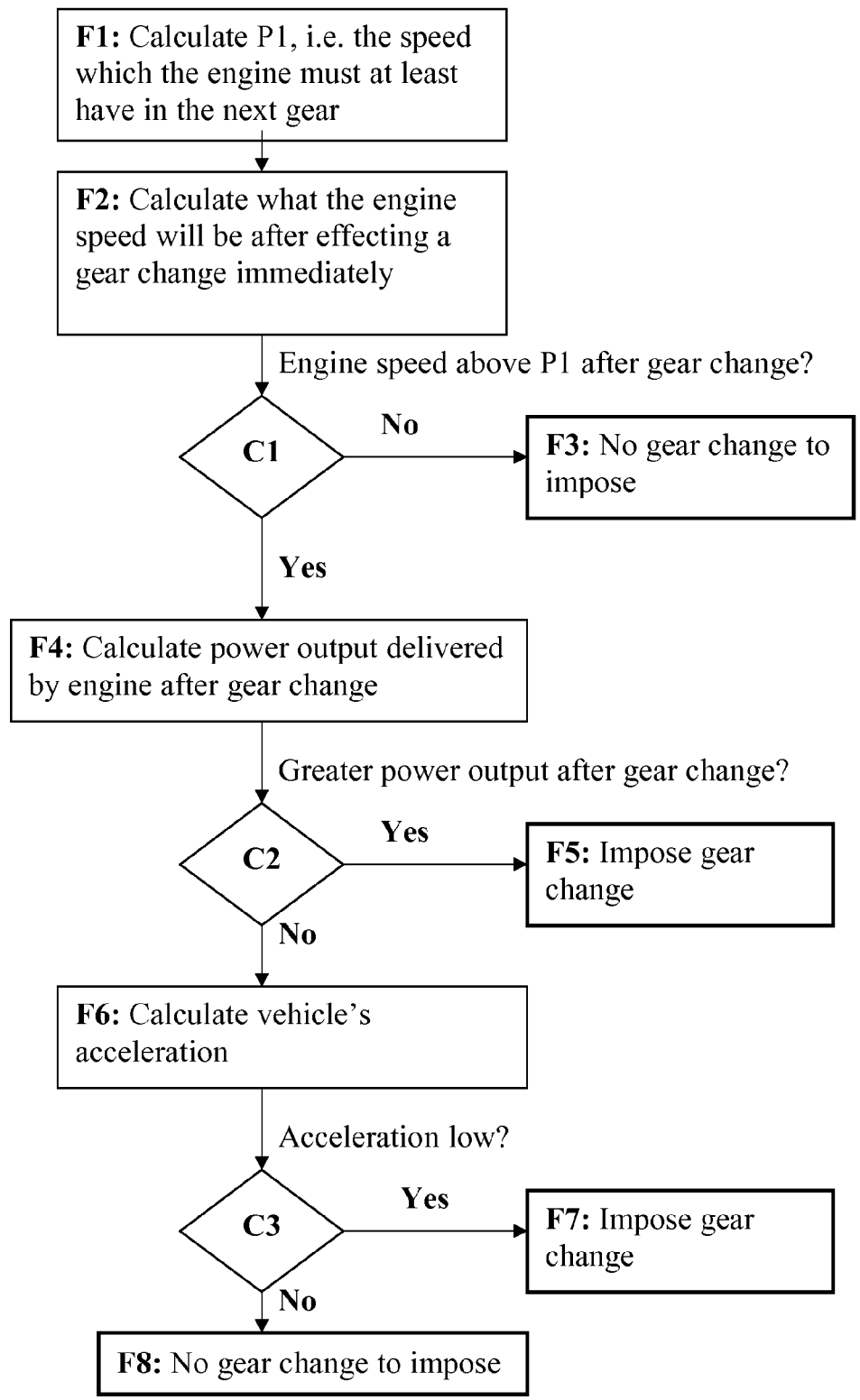
FIG. 5 is a flowchart of an embodiment of the invention.

FIG. 5 is a flowchart of an exemplified embodiment of the invention. In the first step (at F1), calculating whether a shift point should be lowered or not involves calculating the engine speed for point P1, compare also with FIG. 3. This is done by using the torque curve of the engine 10 to calculate the engine speed at which the engine 10 delivers sufficient torque for the vehicle 1 to be able to accelerate or maintain the same vehicle speed in the next gear. When P1 has been calculated, a check is done, at F2 in the diagram, to see whether the engine speed is or is not above point P2 on the torque curve. This is done by simulating a gear change and using the engine speed difference during the gear change (i.e. a simulated loss of engine speed from when a gear change is initiated to when it is completed) to decide whether the engine 10 will, after the gear change, be above P1 or not. At C1, if the engine speed after the gear change is above point P1, it means that the current engine speed is above point P2. If the engine speed is not above P2, an upshift is not imposed (F3).

The next step, at C2, is to decide whether the engine 10 is above or below point P3. Deciding this involves calculating the power output in the next gear (F4). This can be done on the basis of knowing the engine speed and the torque after the gear change. The engine speed after the gear change has been calculated at F2 and the torque at that engine speed is taken from the torque curve of the engine 10. Comparison is then possible with the engine speed and the torque before the gear change, since the power output is arrived at by multiplying the torque by the engine speed. If the power output is greater after than before the gear change, a gear change is imposed (at F5). At C3, if such is not the case, a gear change (F7) is only imposed if the calculated value of the acceleration (F6) of the vehicle 1 is substantially nil or low. To decide whether the acceleration of the vehicle 1 is substantially nil or low, a threshold value for the engine speed acceleration may be introduced, e.g. 5 rpm/s, which means that the engine speed acceleration has to have been below this threshold value for a certain time, e.g. 2 seconds, to fulfil the condition of being substantially nil or low.

The invention relates also to a motor vehicle 1, e.g. a truck or bus, which comprises at least one system for determination of one or more downshift and upshift points according to the invention.

The invention relates also to a method for changing gear in a gearbox 20 which is installed in a motor vehicle 1. The method corresponds to the above system and comprises the following steps: effecting a first upshift from a first gear G1 to a second gear G2 if the acceleration a for said vehicle 1 is greater than nil in said second gear G2 and the current engine speed is within a first speed range I1; and further effecting a second upshift from said first gear G1 to a third gear G3 if the current engine speed is within a second speed range I2, said first speed range I1 being a lower speed range than said second speed range I2 of said engine 10.

It should also be noted that the above method may be modified according to the various embodiments of a system for control of a gearbox according to the invention.

Specialists will also appreciate that a method for changing gear in a gearbox 20 according to the present invention might also be implemented in a computer program which, when executed in a computer, causes the computer to effect the method. The computer program is contained in a computer program product's computer-readable medium which takes the form of a suitable memory, e.g. ROM (read-only memory), PROM (programmable read-only memory), EPROM (erasable PROM), flash memory, EEPROM (electrically erasable PROM), hard disc unit, etc.

Figure 4:
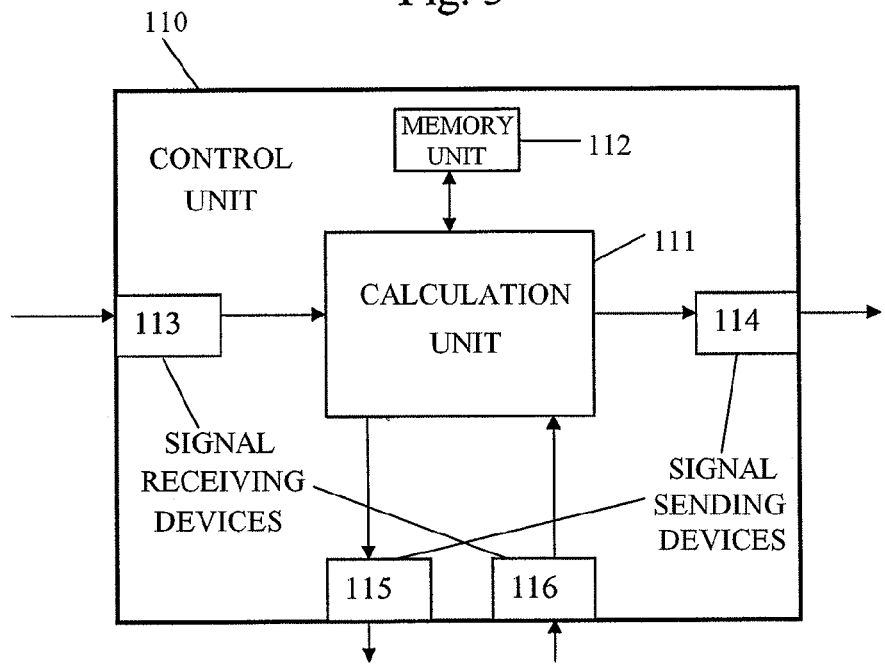

FIG. 4 depicts schematically a control unit 110 forming part of a system according to the invention. The control unit 110 comprises a calculation unit 111 which may take the form of substantially any suitable type of processor or microcomputer, e.g. a circuit for digital signal processing (digital signal processor, DSP) or a circuit with a predetermined specific function (application specific integrated circuit, ASIC). The calculation unit 111 is connected to a memory unit 112 which is incorporated in the control unit 110 and which provides the calculation unit 111 with, for example, the stored program code and/or the stored data which the calculation unit 111 needs in order to be able to perform calculations. The calculation unit 111 is also adapted to storing partial or final results of calculations in the memory unit 112.

The control unit 110 is further provided with devices 113, 114, 115, 116 for respectively receiving input signals and sending output signals. These input and output signals may comprise waveforms, pulses or other attributes which the signal receiving devices 113, 116 can detect as information and which can be converted to signals processable by the calculation unit 111. The calculation unit 111 is then provided with these signals. The signal sending devices 114, 115 are adapted to converting signals received from the calculation unit 111 in order to create, e.g. by modulating the signals, output signals which can be transmitted to other parts of the system for determination of downshift and upshift points. One skilled in the art will appreciate that the aforesaid computer may take the form of the calculation unit 111 and that the aforesaid memory may take the form of the memory unit 112.

Each of the connections to the devices for respectively receiving input signals and sending output signals may take the form of one or more from among the following: cable, data bus, e.g. a CAN (controller area network) bus, a MOST (media orientated systems transport) bus or some other bus configuration, or a wireless connection. The connections 70, 80, 90, 100 in FIG. 1 may also take the form of one or more of these cables, buses or wireless connections.

Finally, the present invention is not limited to its embodiments described above, but relates to and comprises all embodiments within the scope of protection of the attached independent claims.

The invention claimed is:

1. A system for control of a gearbox, wherein the gearbox is installed in a motor vehicle, and the vehicle comprises an engine connected to drive the gearbox;
the system comprising at least one control unit for controlling the gearbox, wherein the gearbox has shift points at which upshifts and downshifts of gears occur;
the system being configured and operable for:
effecting a first upshift from a first gear to a second gear if acceleration a for the vehicle is greater than nil for the second gear and the current engine speed is within a first engine speed range; and
effecting a second upshift from the first gear to a third gear if the current engine speed is within a second engine speed range, wherein the first engine speed range is a lower engine speed range than the second engine speed range.

2. A system according to claim 1, wherein a power output from the engine is greater after than before the second upshift.

3. A system according to claim 1, wherein the first and second upshifts are effected by downward movement of shift points in the gearbox.

4. A system according to claim 1, wherein the first engine speed range and the second engine speed range are mutually adjacent and are demarcated by an engine speed at which a power output from the engine is the same before and after an upshift.

5. A system according to claim 4, in which the first engine speed range has a lower limit at the speed at which acceleration of the engine is possible after the first upshift, and the second engine speed range has an upper limit at a maximum engine speed for the engine.

6. A system according to claim 1, wherein the first and second upshifts comprise one or more gear steps in the gearbox.

7. A system according to claim 1, wherein the acceleration a is calculated or is measured in real time.

8. A system according to claim 1, wherein the second gear and the third gear are the same gear.

9. A system according to claim 1, wherein the second gear and the third gear are different gears.

10. A system according to claim 1, wherein the acceleration a for the vehicle is substantially nil or low for the first gear.

11. A system according to claim 1, wherein the gearbox is an automatic gearbox or an automated manual gearbox comprising a plurality of gears, and the vehicle is within the category which comprises trucks and buses.

12. A motor vehicle comprising at least one system for control of a gearbox, wherein the gearbox is installed in a motor vehicle, and the vehicle comprises an engine connected to drive the gearbox;
the system comprising at least one control unit for controlling the gearbox, wherein the gearbox has shift points at which upshifts and downshifts of gears occur;
the system being configured and operable for:
effecting a first upshift from a first gear to a second gear if acceleration a for the vehicle is greater than nil for the second gear and the current engine speed is within a first engine speed range; and
effecting a second upshift from the first gear to a third gear if the current engine speed is within a second engine speed range, wherein the first engine speed range is a lower engine speed range than the second engine speed range.

13. A method for changing gear in a gearbox installed in a motor vehicle wherein the vehicle comprises an engine connected to drive the gearbox,
the method comprising the steps of:
effecting a first upshift from a first gear to a second gear if acceleration a for the vehicle is greater than nil for the second gear and the current engine speed is within a first engine speed range; and
effecting a second upshift from the first gear to a third gear if the current engine speed is within a second engine speed range, and the first engine speed range is a lower engine speed range than the second engine speed range.

14. A computer program comprising a non-transitory program code, which program, when said program code is executed in a computer, causes the computer to effect a method comprising:
effecting a first upshift from a first gear to a second gear if acceleration a for the vehicle is greater than nil for the second gear and the current engine speed is within a first engine speed range; and
effecting a second upshift from the first gear to a third gear if the current engine speed is within a second engine speed range, and the first engine speed range is a lower engine speed range than the second engine speed range.

15. A computer program product comprising a computer-readable medium and a computer program comprising a non-transitory program code, which program, when said program code is executed in a computer, causes the computer to effect a method comprising:
effecting a first upshift from a first gear to a second gear if acceleration a for the vehicle is greater than nil for the second gear and the current engine speed is within a first engine speed range; and
effecting a second upshift from the first gear to a third gear if the current engine speed is within a second engine speed range, and the first engine speed range is a lower engine speed range than the second engine speed range,
wherein the computer program is contained in the computer-readable medium, the computer-readable medium being within a category which comprises ROM (read-only memory), PROM (programmable ROM), EPROM (erasable PROM), flash memory, EEPROM (electrically erasable PROM) and a hard disc unit.

* * * * *